Aug. 3, 1965     J. K. BARRY     3,198,058
BLIND RIVET
Filed March 20, 1963
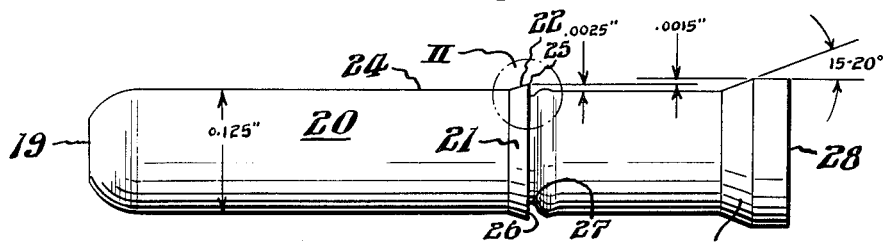
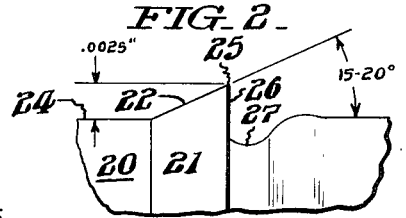
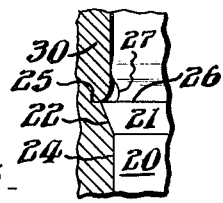
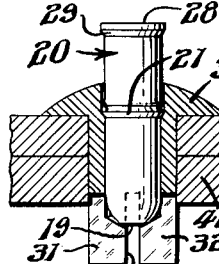
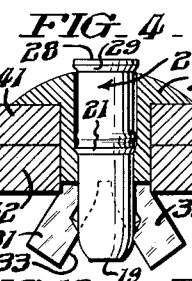
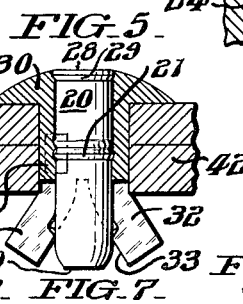
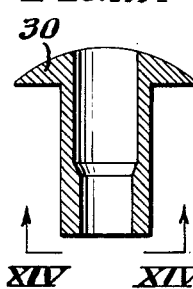
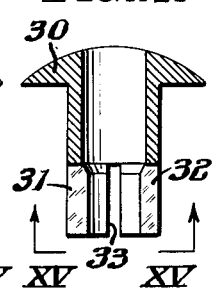
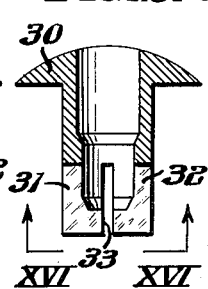
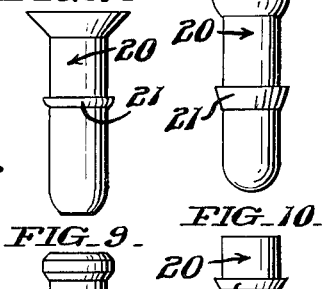
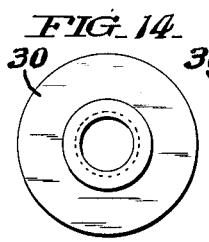
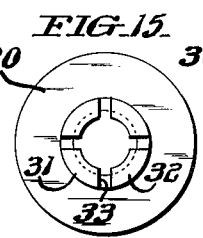
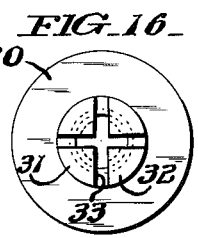
INVENTOR.
John K. Barry,
BY
Paul & Paul
ATTORNEYS.

United States Patent Office 3,198,058
Patented Aug. 3, 1965

3,198,058
BLIND RIVET
John K. Barry, Springfield, Pa., assignor to South Chester
Corporation, Lester, Pa., a corporation of Delaware
Filed Mar. 20, 1963, Ser. No. 266,732
1 Claim. (Cl. 85—84)

This invention relates to a blind-type rivet and particularly to an improvement in the means for and method of mechanically expanding the shank end of this type of rivet.

The invention is particularly concerned with an improvement in the expander pin (sometimes called a drive-pin, core-pin, or mandrel), and in the combination of the improved expander pin and rivet.

In blind rivets, the expander pin enters the axial bore at the head end and, when hammered or pressed downward through the shank, engages and acts upon an internal shoulder, constriction, or other device within the bore of the rivet shank to cause the rivet shank to radially expand, or, if slotted, to bend outward to form prongs or an enlarged section beyond the attached members. Such prongs or enlargement constitute what is called the "blind head" on this type of rivet.

Heretofore, the expander pins in blind drive-type rivets have been constructed with a circumferential knurl, or with alternate ribs and grooves creating adjacent raised portions or shoulder sections of a diameter greater than the bore of the main pin body, or with other closely spaced means for causing a section of the pin to bind in or grip upon the cylindrical wall of the rivet bore. The purpose of the above is to provide a means for retaining the pin part way in the rivet bore in what is known as the "pre-drive" or "as-assembled" position, and also to provide a good vibration and thrust-resistant lock of pin-to-bore after the pin is urged downward through the bore to its final after-driving position.

The retentive forces which the pin must have are minimally defined in various blind rivet specifications, such, for example, as Military Specifications Mil–R–7885. However, the provision of these retentive forces causes the thrust force required to drive the pin downward through the rivet bore (and to expand the blind rivet) to be too high for thin sheet applications or applications involving easily deformed materials and shapes, such as soft aluminum, plastics, thin corrugated forms, tubing, box or hat sections, and the like. The high force required to "expand" the blind rivet will, in such materials, cause dimpling or other undesirable deformation of the material to be attached. Moreover, if the parts to be attached are not rigid enough, or are not properly backed up to prevent springing and absorption of the hammer blow, very often the rivets cannot be expanded at all.

It is for the above reason that a precautionary statement to potential users of this type of rivet is incorporated in the Military Standard Dwg. MS–33557 which reads as follows: "When drive pin-type non-structural rivets are utilized, care must be exercised that sufficient support is afforded to withstand the forces necessary to drive the pins."

Now, in my new pin design, the force required to drive the pin downward and expand the rivet is greatly reduced (by as much as 50% in some sizes), so that drive rivets equipped with my pin may be successfully used in more fragile materials or in materials which are thinner and less well supported. This considerably extends the useful range of the drive type blind rivet. Moreover, even though the driving force is greatly reduced, the pin is better retained within the rivet, and more force is required to dislodge it in either direction, after expansion of the rivet, than is provided by most other retention shapes.

The manner in which the above is accomplished, in accordance with my present invention, will be clearly understood from the following detailed description of several preferred embodiments illustrated in the drawings in which:

FIG. 1 is a greatly enlarged view of my improved expander pin in a preferred form;

FIG. 2 is an enlargement of that portion of the pin of FIG. 1 indicated by the dot-and-dash circle II in FIG. 1;

FIG. 3 is a view, partly in section, illustrating the new expander pin and rivet in the "as-assembled" or "pre-drive" stage;

FIG. 4 shows the rivet fully expanded by the inserted pin, the head of which has not yet entered the bore;

FIG. 5 shows the pin fully inserted;

FIG. 6 is an enlargement of that portion of FIG. 5 indicated by the dot-and-dash rectangle VI in FIG. 5;

FIGS. 7, 8, 9, and 10 illustrate variations of expander pins according to my present invention;

FIGS. 11, 12, and 13 illustrate, in section, variations in blind rivets; and

FIGS. 14, 15, and 16 are end views looking along the lines and in the directions of the arrows indicated by XIV, XV, and XVI in FIGS. 11, 12, and 13.

Referring now to FIG. 1, which shows a preferred form of expander pin design, it will be seen that pin 20 is provided with a single circumferential wedge-like projecting rib 21 which is rolled or otherwise formed on the body of the pin at a location from each end of the pin having a particular relationship to the bore of the rivet into which the pin is to be inserted. More particularly, the rib 21 is so located from the nose 19 of the pin 20 that the rib 21 enters the bore of the rivet before the nose engages the prongs or enlargement which are to be expanded. This is shown in FIG. 3 which shows the rivet 30 and pin 20 in the "as-assembled" or "pre-drive" condition. It will be seen that rib 21 will keep the pin 20 retained in proper position in the bore of the rivet 30 preparatory to driving the pin down to expand the rivet. The rib 21 is so located relative to the head 28 of the pin that rib 21 is the only diametrically enlarged portion of the pin moving through the bore of the rivet during rivet expansion since, as is illustrated in FIG. 4, the rivet becomes fully expanded before the enlarged head 28 of the rivet pin 20 enters the rivet bore. It is not until after the rivet 30 is fully expanded that the enlarged head enters the rivet bore.

As best seen in FIG. 2, the wedge-like rib 21 has a gently rising lead-in slope or ramp 22 of an angle of about 15° (preferably less than 20°) relative to the pin axis. Ramp 22 originates on the basic diametric surface 24 of the pin and rises to a sharp peaked edge 25 at a diameter which, on a one-eighth inch diameter aluminum pin for use in an aluminum rivet, may be approximately .005″ greater than the bore diameter. (This latter figure may increase or decrease slightly depending on rivet size, rivet material, and pin material.) On the trailing side of this wedge-like annular ring 21, the edge falls away at a steep angle with the basic pin surface, to form the buttressing surface 26. The undercut recess 27 shown in FIGS. 1 and 2 is desirable but not necessary. This recess provides more relief for material flow behind the wedge, and better locking.

As the pin 20 is driven into the rivet bore, as shown in FIGS. 3, 4, and 5, this wedge-shaped ring 21 causes the bore through which it passes to dilate. Of course, the pin material must always be harder than the rivet material. Due to the elasticity or resilience of the rivet material, there is some spring back of the rivet immediately behind the sharp edge of the wedge-shaped ring 21, as shown in FIG. 6, so that a reverse push on the pin causes the sharp edge 25 of the wedge to chisel into the wall of the bore, causing, first, a material flow behind surface 26 and into the recess 27, if present, and second, a swelling inwardly of the bore wall due to the chisel action, further increasing resistance to movement in this direction.

In FIG. 4, the rivet 30 is fully expanded, that is, the prongs, such as 31 and 32, are fully spread, thereby securing together the materials, such as sheets 41 and 42, which are to be attached. Thereafter, a final blow on the pin causes the enlarged pin head 28 to enter the partially dilated bore. This is shown in FIG. 5. The bore may or may not have been slightly countersunk or counterbored a very short depth at the open end to receive the pin head 28. If sealing of the hole is desired, the hole is not counterbored and pin head 28 is force-fitted into the hole, but the force required is now only the force necessary to enter the pin head 28, as the force required to expand the rivet 30 has been expended before the pin head 28 reached the bore of the rivet. The force required to cause the pin head 28 to enter the bore is further made relatively small because the pin head is brought up to size by a gently tapering frusto-conical section 29 rising from the basic pin diameter 24 along an angle which, as in the case of ramp 22 of rib 21, is preferably less than 20°. The basic diameter of the pin 20 is dimensioned to provide clearance in the bore of the rivet 30 of at least .0001". The diameter of the head 28 of the pin 20 is controlled to provide a small interference fit in the enlarged rivet bore (of approx. .005") when sealing is required. Any downward thrust, to dislodge the pin when fully driven, now is resisted by the forward wedging action of both the ring 21 and the fully seated pin head 28. This is a relatively large force, being approximately double the force required for expansion of the rivet and far in excess of all pin retaining requirements.

Although the form just described is the simplest and hence a preferred embodiment, other forms which provide the same function may be used. For example, the annular barb ring 21 may rise through a curve, as in FIG. 7, or over a longer slope, as in FIG. 8. Although not preferred, a second wedge ring, such as 21a or 21b, may precede or follow the ring 21, as shown, respectively, in FIGS. 9 and 10. In such case, the wedge rings are so spaced to further ease driving force, or to provide spring back of the bore for additional pin retention. Also, the pins may have heads shaped as shown in FIGS. 7, 8, and 9, or be headless as in FIG. 10 where the second wedge ring 21b provides sufficient retaining force to meet all pin retaining requirements.

FIGS. 11-16 show variations in the forms of rivets in which the new expander pin may be used. In FIGS. 3, 4, and 5, the blind end of the rivet 30 is slotted by two diametric slits (only one slit 33 being visible) the slits being disposed crosswise at right angles to each other, forming four prongs, of which two prongs 31 and 32 are visible in the drawing. The rivets illustrated in FIGS. 12 and 13 are similarly slotted crosswise, as best seen in the corresponding end views of FIGS. 15 and 16. The rivet shown in FIGS. 13 and 16 is adapted for use with the expander pin shown in FIG. 9. The rivet illustrated in FIGS. 11 and 14 is not slitted, and hence has no prongs. Nonetheless, it is considered by the trade to be a blind type of rivet since when the expander pin engages the internal shoulder within the bore, the lower part of the shank is caused to expand radially.

Included among the important features of the preferred embodiments of the new combination of expander pin and rivets are (1) the pin is provided with an annular wedge rib so positioned relative to the nose of the pin that the rib enters into the bore of the rivet before the nose of the pin engages the internal shoulder to expand the rivet, and (2) the wedge rib is so positioned relative to the enlarged head of the pin that the rivet is fully expanded by the inserted pin before the head of the pin enters the bore. This structural combination results in a substantial reduction in force required to expand the rivet while nevertheless meeting all pin-retaining requirements.

In a preferred form, both the pin and the rivet are made of aluminum, with the pin being made of high-strength aluminum, harder, of course, than that of the rivet. The pin and rivet may, however, be made of other metals, such as steel.

The preferred form of expander pin is provided with but a single annular wedge-like rib, as illustrated in FIG. 1. In some cases, however, two (or even three) such ribs may be provided, but at spaced-apart locations, as indicated by the forms of pin shown in FIGS. 9 and 10.

These two (or three) spaced-apart annular ribs are, however, to be clearly distinguished from the closely-spaced serrations or knurlings of prior art pins, since the force required to drive pins of the type shown in FIGS. 1, 7, 8, 9, and 10 to expand the rivet, is very considerably less than that required to drive the prior art pins to expand the rivet. Nevertheless, once driven to fully inserted position, as in FIG. 5, the pins of the present application have adequate resistance against pull-out or push-out to meet all necessary requirements.

While the preferred embodiments of this invention have been described in some detail, it will be obvious to one skilled in the art that various modifications may be made without departing from the invention as hereinafter claimed.

Having described my invention, I claim:

In combination: a rivet having a head and an elongated shank having a bore of substantially constant diameter extending from the head into the shank, said bore terminating in an inwardly-extending shoulder facing said head, said shank therebeyond being adapted to be expanded radially; an expander pin for insertion in the bore of said rivet, said pin having a length substantially longer than said rivet bore and a basic diameter corresponding to the diameter of said bore, said pin having a wedge head at one end and a circumferential wedge rib protruding beyond the basic pin diameter at a point above the other or nose end of said pin a distance less than the length of said bore, said wedge rib having a ramp surface which inclines outwardly from the basic surface of the pin in the direction of the head at an angle of between 15° and 20°, said wedge head having a conical surface portion and a cylindrical surface portion thereabove, said conical surface portion extending outwardly from the basic diameter of said pin to the diameter of said cylindrical surface portion, said wedge head being adapted to mate within the rivet bore under a press fit, thereby to seal the hole in the rivet, the largest diametral dimension of said wedge rib being smaller than the diametral dimension of the cylindrical surface of the head, said rib and said wedge head being the only portions of said pin having a diameter larger than the basic diameter of said pin, said pin also having an annular recess immediately in back of said rib, said recess having its bottom spaced radially inwardly of the basic pin diameter, the rivet and expander pin having such relationship that when said pin is inserted into predrive position in the bore of said rivet, said rib enters said bore to dilate the same before the nose end of said pin engages the internal shoulder to expand the rivet, said pin having such greater length than said rivet bore that said head remains outside said bore until after said pin has been driven in beyond the end of said bore to expand fully said rivet, said rivet being made of metal having sufficient elastic properties to return the dilated bore at least partially toward its original diameter in the region between said rib and the head end of the rivet bore.

References Cited by the Examiner

UNITED STATES PATENTS

| | | | |
|---|---|---|---|
| 1,200,594 | 10/16 | Curtis | 85—21 |
| 2,140,749 | 12/38 | Kaplan | 85—21 |
| 2,569,826 | 10/51 | Packard. | |
| 2,877,682 | 3/59 | Barry et al. | 85—84 |
| 2,898,798 | 8/59 | Carno. | |
| 3,044,340 | 7/62 | Luhm. | |
| 3,105,407 | 10/63 | Rapata | 85—84 |
| 3,147,525 | 9/64 | Texier | 85—77 |

CARL W. TOMLIN, *Primary Examiner.*

EDWARD C. ALLEN, *Examiner.*